United States Patent [19]

Mori

[11] 4,412,972
[45] Nov. 1, 1983

[54] ALUMINUM BASE BEARING ALLOY

[75] Inventor: Sanae Mori, Nagoya, Japan

[73] Assignee: Daido Metal Co., Inc., Japan

[21] Appl. No.: 404,674

[22] Filed: Aug. 3, 1982

[30] Foreign Application Priority Data

Mar. 31, 1982 [JP] Japan ................................ 57-52398

[51] Int. Cl.³ ............................................ C22C 21/14
[52] U.S. Cl. .................................................. 420/530
[58] Field of Search ............... 420/530, 532, 535, 536; 148/11.5 A, 12.7 A, 438, 439

[56] References Cited

U.S. PATENT DOCUMENTS 3,545,943 12/1970 Miller et al. ..................... 420/530
4,278,740 7/1981 Nara et al. ........................ 420/530

FOREIGN PATENT DOCUMENTS 56-35744 4/1981 Japan ................................ 420/530
491718 2/1976 U.S.S.R. ........................... 420/530

Primary Examiner—L. Dewayne Rutledge
Assistant Examiner—Robert McDowell
Attorney, Agent, or Firm—Karl W. Flocks; Sheridan Neimark

[57] ABSTRACT

Aluminum base bearing alloys of increased resistance to fatigue and/or anti-seizure property suitable for use with internal combustion engines. One of the aluminum bearing alloys of this kind is an alloy of the Al-Pb-Sn-Cu-Si system having added thereto at least one element selected from the group consisting of Ni, Mn, Cr, V, Mg, Ti, Zn, Co and Zr, and the other aluminum bearing alloy of an improved type is an alloy of the aforesaid Al-Pb-Sn-Cu-Si- (added further with at least one of Ni, Mn, Cr, V, Ti, Zn, Co, Zr) and further added thereto at least one element selected from the group consisting of Sb, Bi, Cd and In.

4 Claims, 3 Drawing Figures

ALUMINUM BASE BEARING ALLOY

BACKGROUND OF THE INVENTION

This invention relates to bearing alloys of the aluminum-lead system.

Heretofore, alloys of the aluminum-tin system have been in use as aluminum base bearing alloys.

In recent years, the great advances made in the progress of internal combustion engines have created a demand for bearings which are by far superior to those of the prior art in the properties of resistance to fatigue and seizure.

SUMMARY OF THE INVENTION

OBJECT OF THE INVENTION

This invention has as its object the provision of aluminum bearing alloys having increased resistance to fatigue and/or seizure.

DESCRIPTION OF THE INVENTION

To accomplish the aforesaid object, the present invention provides an alloy system comprising an alloy of the Al-Pb-Sn-Cu-Si system to which is added at least one of the elements selected from the group consisting of Ni, Mn, Cr, V, Mg, Ti, Zn, Co and Zr, and an alloy of the above-mentioned Al-Pb-Sn-Cu-Si system to which is added further at least one of the elements selected from the group consisting of Sb, Bi, Cd and In.

The reasons for limiting the chemical composition of the aluminum bearing alloys according to the invention, including the reasons for setting the upper and lower limits of each component of the composition as recited and the effects achieved in operation including the synergystic operation and synergystic effect will be set forth one by one as follows:

(1) Pb, over 9.0% and below 40%

Addition of this element increases antiseizure property, affinity with oil and machinability too. When the amount is below 9.0%, the addition results in little effect. However, when the amount exceeds 40%, mechanical strength is reduced and resistance to fatigue is also reduced.

(2) Cu, 0.2–5%

Addition of this element brings about improved mechanical strength of the aluminum matrix, thereby providing improvements in the mechanical properties of the bearings including the load bearing ability and resistance to fatigue. When the amount is less than 0.2%, the addition brings about little effect in increasing resistance to fatigue and the load bearing ability of the alloys. When the amount exceeds 5%, a marked reduction in ductility is brought about which lowers workability in plastic deformation.

(3) Sn, 0.2–10.0%

Addition of this element improves the surface performance of the alloys, such as resistance to seizure and conformability in a general sense, and the resistance of Pb to corrosion. When the amount is less than 0.2%, the addition brings about little effect, but when it exceeds 10.0%, the mechanical strength of the alloys is reduced.

(4) Si, 0.1–10.0%

By being dispersed in the aluminum matrix, this element increases resistance to creep and seizure. When the added amount is less than 0.1%, no effect of addition is observed, while if the amount exceeds 10.0%, elongation is adversely effected and workability for plastic deformation is reduced.

(5) At least one element within the range of 0.01–3% selected from the group consisting of Ni, Mn, Cr, V, Mg, Ti, Zn, Co and Zr, 0.01–3%

When the amount of one or more of these elements added is less than 0.01%, it contributes little to increase in resistance to fatigue and seizure which is the object of the invention. However, when the amount exceeds 3%, the alloys are lowered in toughness. The optimum amount of this optionally selected element should be determined by taking into consideration the synergystic effect which the element would achieve with the essential elements of paragraphs (1)–(4) above. It has been ascertained that when the amount is in the range between 0.01 and 3% in total, the addition of at least one optionally selected element of the group achieves the best results.

(6) At least one element selected from the group consisting of Sb, Bi, Cd and In, 0.1–3.0%

These elements are added for the purpose of increasing resistance to seizure. When the amount is less than 0.1%, the addition has little effect; when the amount exceeds 3.0%, strength is reduced which is not desirable.

(7) Incidental impurities

Impurities, such as Fe, may be inevitably contained in the alloys according to the invention.

DESCRIPTION OF THE PREFERRED EMBODIMENT

Figure 1:
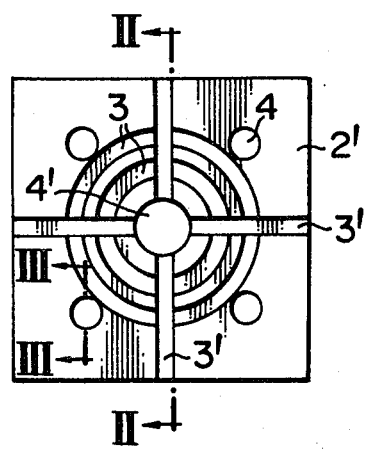
FIG. 1 is a front view of a test piece used for seizure tests conducted by using a seizure tester of the Suzuki type.
Figure 2:
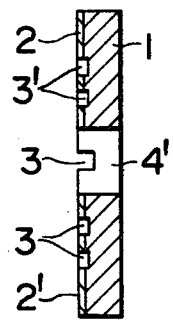
FIG. 2 is a vertical sectional view taken along the line II—II in FIG. 1.
Figure 3:
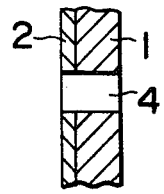
FIG. 3 is a vertical sectional view taken along the line III—III in FIG. 1.

Table 1 shows the composition of the alloys according to the invention. The chemical components themselves and/or an aluminum alloy and a lead alloy in powder form were mixed, and the mixture was compacted and subjected to heat treatment, before being extruded at the extrusion ratio of 7:1–15:1. Then the alloys were subjected to heat treatment and rolling in the indicated order to produce strips of alloys. The Al-Sn-Cu alloy used for comparison purposes was cast and rolled into strips. The strips obtained were each superposed on a steel plate backing and bonded thereto by applying pressure to provide a composite strip of an alloy layer and a lining which was shaped, by a bearing shaping machine, into multi-layer bearings of semicylindrical shape (slide bearings or plain bearings) each having an inner diameter of 40 mm, a width of 17.1 mm and a lining thickness of 0.3 mm, and into test pieces having a shape as shown in FIGS. 1–3 to be tested on a seizure testing machine of the Suzuki type.

The test piece shown comprises an aluminum alloy layer (of the chemical composition shown in Table 1) 2 superposed on a steel backing layer 1 and pressure bonded thereto. The test piece is formed with two concentric annular grooves 3 extending from a surface 2' of the aluminum alloy layer 2 reaching to the interior of the steel backing layer 1 and two straight grooves 3' crossing each other in cruciform. The test piece is formed substantially in its central portion with a through hole 4' of a relatively large diameter and around the through hole 4' with a plurality of through holes 4 of a relatively small diameter, to attach the test piece to the seizure testing machine of the Suzuki type.

(6) Oil feeding pressure—3.0 kg/cm².
(7) Lubricating oil—+20 straight motor oil.
(8) Oil feeding angle—advance angle 36 degrees.
(9) Assessment of fatigue—when fatigue developed in area over 5% of the area of the bearing the test

TABLE 1

| Alloy | Chemical Composition | | | | | | | |
|---|---|---|---|---|---|---|---|---|
| | Al | Pb | Cu | Sn | Si | Ni | Mn | Cr | V |
| For comparison | Bal. | None | 1 | 20 | ← | — | None | → | → |
| Alloys of the Invention | | | | | | | | | |
| 1 | Bal. | 9.2 | 5 | 0.2 | 10.0 | None | 0.01 | — | None |
| 2 | Bal. | 15 | 2 | 5.0 | 0.1 | None | None | — | None |
| 3 | Bal. | 30 | 1.0 | 6.0 | 5.0 | None | None | 1.0 | None |
| 4 | Bal. | 40 | 1.0 | 10.0 | 10.0 | 1.0 | None | 0.5 | 0.5 |
| 5 | Bal. | 12 | 0.2 | 0.2 | 3.0 | 0.2 | None | 0.4 | None |
| 6 | Bal. | 20 | 5 | 3.0 | 0.2 | None | 1.0 | — | None |
| 7 | Bal. | 15 | 0.5 | 0.5 | 4.0 | None | None | None | 0.8 |
| 8 | Bal. | 10 | 3 | 0.5 | 8.0 | 1.0 | None | None | 0.5 |
| 9 | Bal. | 35 | 0.2 | 10.0 | 3.0 | 0.5 | 0.5 | None | None |
| 10 | Bal. | 30 | 2.5 | 8.5 | 0.8 | 1.5 | 0.2 | 0.3 | 0.3 |
| 11 | Bal. | 20 | 1.5 | 0.8 | 10.0 | 0.5 | None | None | 1.5 |
| 12 | Bal. | 40 | 4 | 5.5 | 6.0 | None | 0.7 | — | None |

| | Mg | Ti | Zn | Co | Zr | Sb | Bi | Cd | In |
|---|---|---|---|---|---|---|---|---|---|
| For comparison | ← | ← | ← | ← | None | ← | → | → | → |
| Alloys of the Invention | | | | | | | | | |
| 1 | — | ← | ← | ← | None | → | → | → | → |
| 2 | — | None | 3 | ← | ← | None | → | → | → |
| 3 | None | ← | ← | ← | None | → | → | → | → |
| 4 | None | 0.02 | ← | ← | ← | None | → | → | → |
| 5 | 0.2 | None | 2 | 0.1 | 0.1 | ← | None | → | → |
| 6 | — | 0.1 | None | 1.0 | ← | ← | None | → | → |
| 7 | 0.2 | 0.5 | 1.5 | ← | ← | None | → | → | → |
| 8 | None | 0.1 | None | 0.5 | None | 3.0 | ← | None | → |
| 9 | 0.5 | 0.01 | None | 0.1 | 0.05 | ← None → | 0.1 | None |
| 10 | None | None | 0.5 | None | 0.01 | 2.8 | 0.1 | None | 0.1 |
| 11 | 0.2 | 0.3 | None | 0.5 | None | 1.5 | None | 0.5 | 0.4 |
| 12 | None | ← | ← | None | → | 0.8 | 1.0 | 1.0 | None |

Table 2 shows the results of fatigue tests conducted on the multilayer bearing of the aforesaid construction, and Table 3 shows the results of seizure tests conducted thereon. The conditions of the fatigue tests were as follows:

(1) Testing machine—Dynamic load fatigue testing machine.
(2) Number of Revolution—4000 rpm.
(3) Testing time—20 hours.
(4) Peripheral velocity—11.1 m/sec.
(5) Oil Feeding temperature—120° C.

bearing is deemed fatigued.
The conditions of the seizure tests were as follows:
(1) Surface pressure—accumulated load of about 29.5 kg/cm² per load.
(2) Velocity—1.93 m/sec.
(3) Time of testing—30 minutes for each load.
(4) Lubricating oil—+30 motor oil.
(5) Definition of seizure—a back surface temperature of 200° C. or a frictional force of 56 kg/cm is the basis for deciding whether fatigued or not.
(6) Testing machine—seizure testing machine of the Suzuki type.

TABLE 2

| | Results of Fatigue Tests | | | |
|---|---|---|---|---|
| Alloy | Bearing Load (kg/cm²) | | | |
| | 300 | 350 | 400 | 450 |
| Alloy for comparison | ⊢——————⊢———→ Fatigue | | | No fatigue |

| Present Invention | | | | |
|---|---|---|---|---|
| 1 | ⊢——————————————————→ | | | No fatigue |
| 2 | ⊢——————————————————→ | | | Fatigue |
| 3 | ⊢————————→ Fatigue | | | |
| 4 | ⊢————————→ Fatigue | | | |
| 5 | ⊢———————————————→ | | | Fatigue |
| 6 | ⊢————————————→ Fatigue | | | |

TABLE 2-continued

| | | | | | |
|---|---|---|---|---|---|
| 7 | | | | | →No fatigue |
| 8 | | | | | →No fatigue |
| 9 | | →  | Fatigue | | |
| 10 | | → | Fatigue | | |
| 11 | | | | Fatigue | |
| 12 | | → | Fatigue | | |

TABLE 2

| Alloy | Results of Seizure Tests Bearing Load (kg/cm²) | | | | | | | | | | |
|---|---|---|---|---|---|---|---|---|---|---|---|
| | 29.5 | 58.5 | 88.4 | 117.9 | 147.4 | 176.9 | 206.4 | 235.8 | 265.3 | 294.8 | |
| Alloy for comparison | | | | | →0 | | | | | | |
| Alloys of Present Invention | | | | | | | | | | | |
| 1 | | | | | | →0 | | | | | |
| 2 | | | | | | | →0 | | | | |
| 3 | | | | | | | | | →0 | | |
| 4 | | | | | | | | | | | →No seizure |
| 5 | | | | | | | →0 | | | | |
| 6 | | | | | | | | →0 | | | |
| 7 | | | | | | | →0 | | | | |
| 8 | | | | | | | →0 | | | | |
| 9 | | | | | | | | | | | →No seizure |
| 10 | | | | | | | | | | | →No seizure |
| 11 | | | | | | | | | | →0 | |
| 12 | | | | | | | | | | | →No seizure |

From the results of the tests shown hereinabove, it will be seen that the alloys according to the invention (specimens Nos. 1-12) have increased resistance to seizure property as compared with the sample for comparison which represents the prior art. It will also be seen that, with regard to the resistance to fatigue, the specimens Nos. 3, 4, 9, 10 and 12 of the present invention are similar to the sample for comparison but the specimens Nos. 1, 2, 5, 6, 7, 8 and 11 of the invention are superior to the control. Thus it will be evident that the invention has succeeded in accomplishing the objects set forth hereinabove.

What is claimed is:

1. An aluminum base bearing alloy consisting essentially, by weight, of over 9.0% and below 40% lead, 0.2-5% copper, 0.2-10.0% tin, 0.1-10.0% silicon, 0.01-3% at least one element selected from the group consisting of, vanadium, titanium, zinc, cobalt and zirconium, and the balance being incidental impurities and aluminum.

2. An aluminum base bearing alloy in accordance with claim 1, further containing at least one additional element selected from the group consisting of nickel, manganese, chromium and magnesium, the total quantity of said at least one additional element together with the total quantity of vanadium, titanium, zinc, cobalt and zirconium, being in the range of 0.01-3 weight %.

3. An aluminum base bearing allow according to claim 1, further containing 0.1-3 weight % of at least one element selected from the group consisting of antimony, bismuth, cadmium and indium.

4. An aluminum base bearing alloy according to claim 2, further containing 0.1-3 weight % of at least one element selected from the group consisting of antimony, bismuth, cadmium and indium.

* * * * *

UNITED STATES PATENT AND TRADEMARK OFFICE
CERTIFICATE OF CORRECTION

PATENT NO. : 4,412,972
DATED     : November 1, 1983
INVENTOR(S) : Sanae MORI

It is certified that error appears in the above—identified patent and that said Letters Patent is hereby corrected as shown below:

On the title page
please correct the Assignee to read:

-- Daido Metal Co., Ltd. --

Signed and Sealed this

Twentieth Day of March 1984

[SEAL]

Attest:

GERALD J. MOSSINGHOFF

Attesting Officer    Commissioner of Patents and Trademarks